(12) United States Patent
Pleros et al.

(10) Patent No.: US 12,386,232 B2
(45) Date of Patent: Aug. 12, 2025

(54) FIDELITY-RESTORABLE PHOTONIC LINEAR OPERATOR

(71) Applicant: Celestial AI Inc., Santa Clara, CA (US)

(72) Inventors: Nikolaos Pleros, Salonika (GR); Apostolos Tsakyridis, Salonika (GR); Georgios Giamougiannis, Salonika (GR); Angelina Totović, Central Macedonia (GR)

(73) Assignee: Celestial AI Inc., Santa Clara, CA (US)

( * ) Notice: Subject to any disclaimer, the term of this patent is extended or adjusted under 35 U.S.C. 154(b) by 96 days.

(21) Appl. No.: 17/957,731

(22) Filed: Sep. 30, 2022

(65) Prior Publication Data

US 2023/0104033 A1    Apr. 6, 2023

Related U.S. Application Data

(60) Provisional application No. 63/261,974, filed on Oct. 1, 2021.

(51) Int. Cl.
*G02B 6/122* (2006.01)
*G02B 6/125* (2006.01)
*G02F 1/21* (2006.01)
*G02B 6/12* (2006.01)

(52) U.S. Cl.
CPC .......... *G02F 1/212* (2021.01); *G02B 6/1225* (2013.01); *G02B 6/125* (2013.01); *G02B 2006/12159* (2013.01)

(58) Field of Classification Search
CPC .............. G02B 6/1225; G02B 6/125; G02B 2006/12159; G02F 1/212
See application file for complete search history.

(56) References Cited

U.S. PATENT DOCUMENTS

| 6,292,597 B1 * | 9/2001 | Lagali | G02B 6/12011 |
| | | | 385/17 |
| 9,817,297 B1 * | 11/2017 | Melikyan | G02B 6/1225 |
| 2018/0034555 A1 * | 2/2018 | Goh | G02B 6/122 |
| 2021/0341765 A1 * | 11/2021 | Lu | G02F 1/0121 |
| 2023/0010363 A1 | 1/2023 | Cable | |
| 2023/0021995 A1 * | 1/2023 | Cable | G02F 1/212 |
| 2024/0393659 A1 * | 11/2024 | Cable | G02F 1/311 |

OTHER PUBLICATIONS

Ribeiro et al., "Matrix Addressing Silicon Photonics Phase Shifters using Heaters with Integrated Diodes", European Conference on Integrated Optics, Jul. 2018, Student Paper, 3 pages. (Year: 2018).*
Office Action Received for U.S. Appl. No. 17/957,812, mailed on Sep. 9, 2024, 13 pages.
(Continued)

*Primary Examiner* — Daniel Petkovsek
(74) *Attorney, Agent, or Firm* — Ray Quinney & Nebeker P.C.; James S. Bullough

(57) ABSTRACT

The present disclosure relates to implementations of a photonic circuit, and particularly to a photonic circuit that includes one or more matrix circuits. For example, the present disclosure relates to photonic circuit implementations of unitary matrices, and of arbitrary real and/or complex matrices factorized using unitary matrices, that utilize special generalized Mach-Zehnder interferometers (SGMZIs) as building blocks of various matrix circuit architectures.

16 Claims, 5 Drawing Sheets

(56) References Cited

OTHER PUBLICATIONS

A. Ribeiro et al., "Demonstration of a 4 x4-port universal linear circuit," Optica 3, 1348-1357 (2016). 10 pages.
C. Taballione et al., "A universal fully reconfigurable 12-mode quantum photonic processor", IOP science Mater, Quantum Technol. 1 035002, August (2021). 9 pages.
D. J. Rowe et al., " Representations of the Weyl group and Wigner functions for SU(3)", J. Math. Phys. 40, 3604 (1999), 12 pages.
D. Miller, "Self-configuring universal linear optical component [Invited]," Photon. Res. 1, 1-15 (2013). 15 pages.
D. Miller., "Perfect optics with imperfect components," Optica 2, 747-750 (2015). 4 pages.
D. Perez et al., "Reconfigurable lattice mesh designs for programmable photonic processors," Opt. Express 24, 12093-12106(2016). 14 pages.
F. D. Murnaghan, "The Unitary and Rotation Groups", vol. 3, chapter 2, p. 7, (1962). 155 pages.
F. Shokraneh et al., "The diamond mesh, a phase-error- and loss-tolerant field- programmable MZI-based optical processor for optical neural networks," Opt. Express 28, 23495-23508 (2020). 14 pages.
H. De Guise et al., "Simple factorization of unitary transformations", Phys. Rev. A 97 (2018). 7 pages.
J. Carolan et al., "Universal linear optics," Science 349, 711-716 (2015). 13 pages.
L. Zhuang et al., "Programmable photonic signal processor chip for radiofrequency applications, "Optica 2, 854-859 (2015). 6 pages.
L.W. Cahill, "The synthesis of generalized Mach-Zehnder optical switches based on multi mode interference (MMI) couplers", Optical and Quantum Electronics 35, 465-473 (2003). 9 pages.
M. Bachmann et al., "General self-imaging properties in N x N multimode interference couplers including phase relations," Appl. Opt. 33, 3905-3911 (1994). 7 pages.
M. E. Marhic, "Hierarchic and combinational star couplers", Optics Letters (1984). 3 pages.
M. Fang et al., "Design of optical neural networks with component imprecisions," Opt. Express 27, 14009-14029 (2019).
M. Mathur et al., "Coherent states for SU(3)" J. Math. Phys. 42 4181-96 (2001). 18 pages.
M. Reck et al., "Experimental realization of any discrete unitary operator," Phys. Rev. Lett 73, 58-61 (1994). 6 pages.
N. Harris et al., "Linear programmable nanophotonic processors" Optica 5, 1623 1631 (2018). 9 pages.
N. S. Lagali et al., "Analysis of generalized Mach-Zehnder interferometers for variable-ratio powersplitting and optimized switching," in Journal of Lightwave Technology, vol. 17, No. 12, pp. 2542-2550, Dec. 1999. 9 pages.
P. Dita, " Factorization of Unitary Matrices" Journal of Physics A General Physics, vol. 32, No. 21 (2006). 12 pages.
R. Biloti et al., " A short note on a generalization of the Givens transformation," Computers & Mathematics with Applications, vol. 66, Issue 1, (2013), 6 pages.
R. Tang et al., "Ten-Port Unitary Optical Processor on a Silicon Photonic Chip", ACS Photonics 2021, 8, 7, 2074-2080. 7 pages.
R.M. Jenkins, "Novel 1 x N and N x N integrated Optical Switches Using Self-Imaging Multimode GaAs/AlGaAs Waveguides" Applied Physics Letters. 64. 684-686. 10.1063/1.111033. 3 pages.
S. Pai et al., "Parallel Programming of an Arbitrary Feedforward Photonic Network" in IEEE Journal ofSelected Topics in Quantum Electronics, vol. 26, No. 5, pp. 1-13, Sep.-Oct. 2020, Art No. 6100813. 13 pages.
W. Bogaerts et al.," Programmable photonic circuits". Nature 586, 207-216 (2020). 39 pages.
W. R. Clements et al., "Optimal design for universal multi port interferometers," Optica 3, 1460-1465 (2016). 8 pages.
Y. Shen et al., "Deep learning with coherent nanophotonic circuits," Nat. Photonics 11, 441-446 (2017). 8 pages.

* cited by examiner

FIDELITY-RESTORABLE PHOTONIC LINEAR OPERATOR

CROSS-REFERENCE TO RELATED APPLICATIONS

This application claims priority to U.S. Provisional Application No. 63/261,974 entitled FIDELITY-RESTORABLE PHOTONIC LINEAR OPERATOR, filed on Oct. 1, 2021, the entirety of which is incorporated herein by reference.

BACKGROUND OF THE DISCLOSURE

In the emerging field of photonic computing, various approaches have been proposed to implement arbitrary linear operators, represented as matrices of any values, with programmable photonic circuits composed of optical splitters and couplers, controllable phase and/or amplitude modulators, etc. Such implementations are commonly based on Singular Value Decomposition (SVD), which factorizes an arbitrary matrix into a diagonal matrix and two unitary matrices, along with further decomposition of the unitary matrices into products of block matrices. The unitary matrix decomposition translates, in the photonic circuit implementation, to partitioning the circuit into smaller blocks of components. To date, the dominant block matrix utilized in photonics for unitary matrix decomposition has been the 2×2 unitary matrix, U(2), which can be realized as a Mach-Zehnder interferometer augmented by two phase shifters. Theoretically, an arbitrary N×N matrix can be implemented with U(2) nodes followed by N phase shifters in N−1 steps of programming. In practice, however, non-ideal, lossy components often result in a loss in fidelity, that is, a discrepancy between the targeted matrix and its practical implementation.

DETAILED DESCRIPTION

Figure 1:
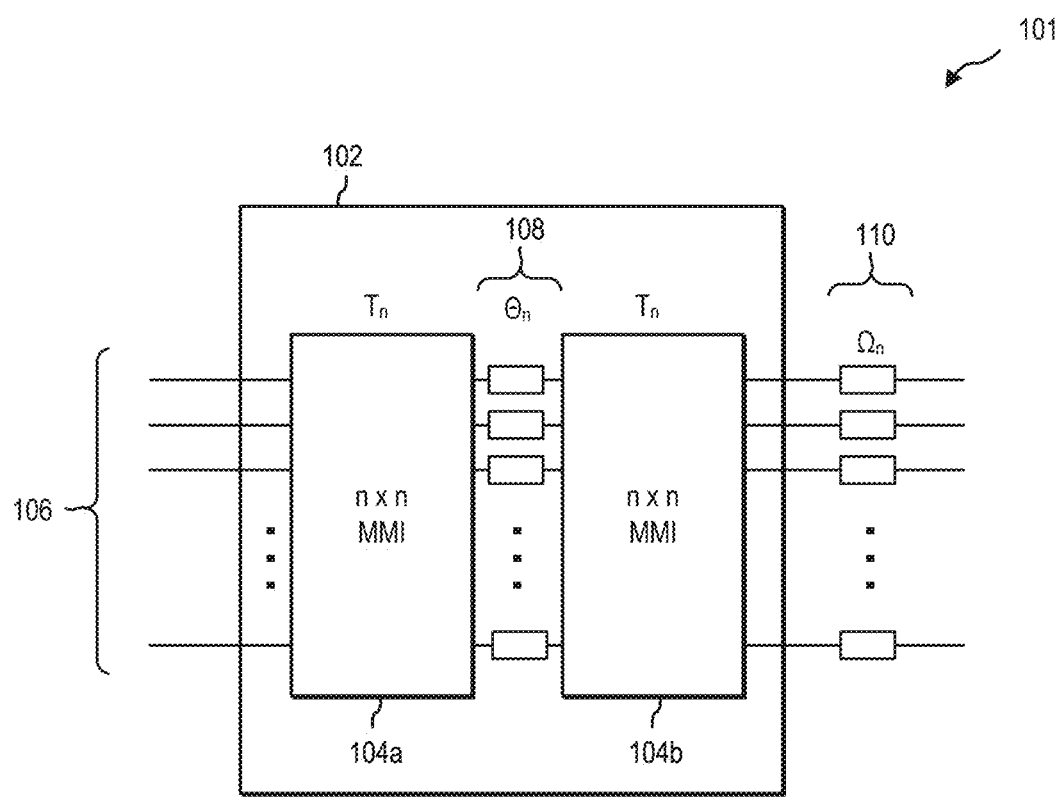
FIG. 1 illustrates an example schematic diagram of a Special Generalized Mach-Zehnder Interferometer (SGMZI) in accordance with one or more embodiments described herein.

The present disclosure relates to implementations of a photonic circuit, and particularly to a photonic circuit that includes one or more matrix circuits. More specifically, the present disclosure relates to photonic circuit implementations of unitary matrices, and of arbitrary real and/or complex matrices factorized using unitary matrices, that utilize special generalized Mach-Zehnder interferometers (SGMZIs) as building blocks of various matrix circuit architectures. In the described photonic matrix circuits, SGMZIs are optically coupled in series, ordered by dimensionality and in a size-augmenting manner, between sets of input and output waveguides. Phase shifters in the SGMZIs provide the requisite degrees of freedom for setting the matrix values of the unitary matrix.

As an illustrative example, one or more embodiments described herein relate to a unitary matrix configuration (e.g., a unitary matrix circuit architecture). For example, one or more embodiments described herein include a photonic circuit, which may include one or more unitary matrix circuits. One or more embodiments of the unitary matrix circuit includes a plurality of SGMZIs, a plurality of waveguide paths, and a fidelity restoration block. The plurality of SGMZIs may include a first SGMZI having a first dimensionality and a second SGMZI having a second dimensionality (greater than the first dimensionality) coupled in series to the first SGMZI. The plurality of waveguide paths may include a first waveguide path that guides signals through both the first and second SGMZIs and a second waveguide path that guides signals through the second SGMZI (e.g., without conducting signals through the first SGMZI). The fidelity restoration block may include attenuators for balancing outputs of the unitary matrix circuit.

As another illustrative example, one or more embodiments described herein relate to an arbitrary matrix configuration (e.g., an arbitrary matrix circuit architecture). For example, one or more embodiments described herein include a photonic circuit, which may include one or more arbitrary matrix circuits. One or more embodiments of the arbitrary matrix circuit includes a first matrix block including a first plurality of SGMZIs coupled in series in order of dimensionality from a lowest dimensionality of the plurality of SGMZIs to a highest dimensionality of the plurality of SGMZIs. The arbitrary matrix circuit may additionally include a second matrix block including a second plurality of SGMZIs coupled in series in reverse order of dimensionality relative to the order of dimensionality that the first plurality of SGMZIs are ordered within the first matrix block. Each of the matrix blocks may include similar features as the unitary matrix circuit. The arbitrary matrix circuit may additionally include a plurality of waveguide paths passing through elements (e.g., SGMZIs) of the first matrix block and the second matrix block.

As will be discussed in further detail herein, the present disclosure includes a number of practical applications and associated features that provide benefits and/or solve problems associated with conventional circuit architectures and, more specifically, computing matrices using photonic circuit hardware. Some example benefits are discussed herein in connection with various features and functionality provided by a number of different matrix configurations.

Beneficially, the disclosed configurations allow to compensate for any optical losses from non-ideal components and fully restore the fidelity, meaning that they can achieve an absolute match between the targeted matrix values and the matrix values realized by the photonic circuit. The proposed photonic circuits can serve to implement matrices in various areas of application, including, without limitation: neuromorphic photonics, where the matrix represents a linear neural network layer; quantum computing, where the matrix realizes a linear quantum optical processor; microwave photonics, where the matrix circuit realizes a single- or multi-beam optical beamforming network; and security applications, where the matrix circuit realizes an arbitrary set of input values for generating physical unclonable functions towards random number generation circuits.

In one example, one or more implementations include a unitary matrix configuration in which a plurality of SGMZIs are implemented within a unitary matrix circuit in a manner that preserves a sum of output ports. In conventional approaches, matrices are often constructed using a Reck configuration (e.g., Reck's triangular mesh) or a Clement configuration (e.g., Clement's rectangular mesh). These layouts, however, often suffer from fidelity problems where signals at outputs of the respective configurations have inconsistent losses caused by the signals passing through unpredictable numbers of components (e.g., GMZIs). In contrast, one or more embodiments of the unitary matrix configurations described herein include pathways and orientations of SGMZIs that provide predictability at the output ports of the matrix circuits. This predictability enables fidelity restoration to be performed based on the losses being balanced and factorable across the plurality of ports.

In another example, one or more implementations include an arbitrary matrix configuration in which a pair of matrix blocks (e.g., unitary matrix blocks) are configured in a manner that provides an inherent balance in signals passing through the arbitrary matrix circuit. For example, as will be discussed below, each of a pair of matrix blocks may include cascaded SGMZIs that are ordered by dimensionality and which are oriented relative to one another to cause signals passing through the arbitrary matrix circuit to pass through a common number of SGMZIs. Indeed, signals passing through each of multiple waveguide paths may pass through a same number of SGMZIs in the arbitrary matrix configuration, causing losses to be inherently balanced across each of any number of output ports of the arbitrary matrix circuit.

Each of the different configurations described herein may further be implemented within a photonic circuit, which may provide power and processing benefits relative to conventional circuits. For example, photonic circuits may provide a significant improvement in processing speed over conventional processing circuits while also using less power. Indeed, photonic circuits (or photonic layers of circuit hardware) often consume significantly less power than non-optical circuit hardware. Moreover, photonic circuits are often smaller and provide additional real estate within a larger system of processing devices.

Additional detail will now be provided in relation to illustrative figures portraying example implementations and associated features of matrix circuit components and configurations described herein. For example, FIG. 1 illustrates an example implementation of an SGMZI used in connection with a unitary matrix circuit and/or arbitrary matrix circuit.

By way of background, a generalized Mach-Zehnder interferometer (GMZI) of dimension n is herein understood as an optical device that functions as a variable-ratio power splitter, coupling light from n input ports to n output ports according to arbitrary assigned power ratios. For n≥2, the GMZI can be implemented by n interferometer paths coupled between two n×n couplers, with n or n−1 phase shifters (herein also "internal phase shifters") in the interferometer paths to adjust the power ratios. For n=1, the GMZI reduces to a waveguide segment, optionally with a phase shifter, coupling light from a single input port to a single output port.

A special GMZI, or SGMZI, as understood herein is a GMZI augmented with an additional set of n or n−1 phase shifters (herein also "external phase shifters") at the input or output ports, for a total of 2n or 2n−1 phase shifters in the SGMZI. In accordance with various embodiments, a unitary matrix circuit is formed of a series of SGMZIs arranged in order of increasing or decreasing dimensionality. Similarly, an arbitrary matrix circuit may include multiple unitary matrix circuits that are each formed of respective series of SGMZIs arranged in order of increasing or decreasing dimensionality.

A series of N SGMZIs with dimensions ranging from n=1 to n=N, each including 2n−1 phase shifters, has a total of $N^2$ phases shifters providing $N^2$ degrees of freedom for realizing any arbitrary N×N (N-dimensional) unitary matrix. When optical inputs collectively representing an N-dimensional input vector are applied to the input waveguides of the unitary matrix circuit, the optical signals that result at the output waveguides collectively represent an N-dimensional output vector equal to the product of the unitary matrix and the input vector. To compensate for any unbalanced optical losses between different optical paths that might otherwise cause inaccuracies in the output, corresponding to a degraded circuit fidelity, the unitary matrix circuit includes, in some embodiments, a set of optical amplitude modulators (attenuators or amplifiers) that can be set, based on the losses, to restore fidelity.

Referring to FIG. 1, an example SGMZI 101 is shown, which includes a GMZI 102 and a plurality of phase shifters 110. As shown in FIG. 1, the GMZI 102 includes a pair of multi-mode interferometers (MMIs) 104a-b. Each of a first MMI 104a and a second MMI 104b may refer to n×n MMIs having n-dimensions corresponding to dimensionality of the corresponding SGMZI 101. As will be discussed below, each of the matrix circuits may be made up from multiple SGMZIs having MMIs of varying dimensionality. As further shown, the GMZI 102 may include a diagonal matrix 108 positioned between the MMIs 104a-b. The GMZI 102 may additionally include a plurality of waveguide paths 106 that pass through the MMIs 104a-b. As will be discussed below, the SGMZI 101 may be a building block of a unitary matrix circuit and an arbitrary matrix circuit.

Additional detail will now be discussed in connection with a universal generalized MZI unitary decomposition techniques as well as unitary and arbitrary matrix circuit architectures implemented in connection with performing unitary or linear transformations. While description of one or more embodiments of a universal generalized MZI unitary decomposition method is described herein, it will be understood that information on the features and calculations on the different matrix circuits may be found in U.S. Provisional Application No. 63/261,974 entitled FIDELITY-RESTORABLE PHOTONIC LINEAR OPERATOR, which is incorporated herein by reference in its entirety.

In one or more embodiments, a decomposition procedure relies on two facts. First, each unitary matrix of size n, $P_n$, can be written as a product of a special unitary matrix of size n, $Q_n$, uniquely defined by a first column vector with 2n−1 free real parameters, and a unitary block matrix of size n consisting of an arbitrary unitary matrix $P_{n-1}$ of size n−1, and an element 1 on its diagonal supplementing up to a size of n. Second, each unitary matrix $Q_n$ of size n can be written in the form of a product of a diagonal matrix with phase element $D_n$ (magnitude of all diagonal elements is one) and a unitary matrix $Q'_n$ of size n, generated by a first volume vector, which is populated by non-negative numbers.

The first of these facts allows for sequential problem dimensionality reduction (e.g., size-augmenting), opening the possibility for implementing a recursive algorithm. The second fact allows the problem to be treated independently with respect to magnitudes and phases, a property particularly of interest when translating an algorithm into a photonic platform layout. Following a recursive procedure and relying on the above, a unitary matrix U(N) can be decomposed into a product of N matrices of the form:

$$U(N) = \prod_{n=N}^{1} Q_n^{N-n},$$

$$Q_n^{N-n} = \begin{bmatrix} I_{N-n} & 0 \\ 0 & Q_n \end{bmatrix}$$

where $Q_n^{N-n}$ is an N×N unitary block diagonal matrix, constructed of an identity matrix of a dimension N−n in its upper-left block, $I_{N-n}$, and an n×n unitary matrix $Q_n$ in the lower-right block.

The matrix $Q_n$ can be written in a form of $Q_n = D_n Q'_n$, by factoring out the phases of all elements in the first column of $Q_n$ to a diagonal matrix, leaving the first column of $Q'_n$ populated by non-negative numbers. In this manner, $D_n$ may have n free real parameters related to phases $\arg(d_k) = \arg(q_{k,1})$, whereas the remaining n−1 free parameters, related to the magnitudes, will remain in the first column of $Q'_n$.

In translating $Q'_n$ matrix to a photonic platform, a modified version of the n×n GMZI is employed that has been proven to serve as variable ratio power splitter, able to cast the light from any or all input to any or all output port(s) according to an assigned ratio, implying that it is capable of implementing any unit vector of the real sphere of dimension n via its electrical field magnitudes. An example implementation of the modified version of the GMZI is shown in FIG. 1, as described above, and is described herein in connection with one or more embodiments as an SGMZI.

Typical n×n GMZI devices include two n×n Multimode Interferometers (MMI) interposed by n PSs, as illustrated in FIG. 1. Their transfer matrix can be expressed as:

$$G_n = T_n \Theta_n T_n$$

with $T_n$ and $\Theta_n$ being transfer matrices of the n×n MMI couplers and the interleaved PSs, respectively:

$$T_n = \frac{1}{\sqrt{n}} \begin{bmatrix} e^{j\varphi_{1,1}} & \cdots & e^{j\varphi_{1,n}} \\ \vdots & \ddots & \vdots \\ e^{j\varphi_{n,1}} & \cdots & e^{j\varphi_{n,n}} \end{bmatrix}$$

$$\Theta_n = \mathrm{diag}[e^{j\theta_1}, e^{j\theta_2}, \ldots, e^{j\theta_n}]$$

both of which are unitary, making also $G_n$, defined above, a unitary matrix. Phases $\varphi_{x,y}$ may be associated with imaging an input x to an output y in an n×n MMI coupler can be determined and calculated as follows:

$$\varphi_{x,y} = \begin{cases} \varphi_0 + \pi + \dfrac{\pi}{4n}(n+1-x-y)(n-1+x+y), & n+x-y \text{ odd} \\ \varphi_0 + \dfrac{\pi}{4n}(n+x-y)(n-x+y), & n+x-y \text{ even} \end{cases}$$

where $\varphi_0$ denotes a constant phase associated with the design parameters of the device (MMI coupler length, number of inputs/outputs, propagation constant). From an experimental perspective, n×n couplers may also be built by concatenating lower dimension couplers, such as 2×2 directional couplers when n is a power of two or cascaded in stages of an L×L coupler array and an M×M coupled array, where n=L×M. In either of the cases, a GMZI transfer function reveals n free real parameters $\theta_k$, which may serve for intensity redistribution or, in other words, adjust the magnitudes of matrix elements if used in the matrix decomposition scheme. This implies that the magnitudes of the $G_n$ first column elements are equal to the magnitudes of the corresponding first column elements of the targeted matrix $Q_n$, or:

$$|q_{r,1}| = \frac{1}{n}\left|\sum_{k=1}^{n} e^{j\theta_k} e^{j(\varphi_{r,k} + \varphi_{k,1})}\right|$$

where $r \in [0,n]$.

Once solved, all elements of the matrix $G_n$ can be determined. Even though the magnitudes of the first columns' elements of $G_n$ and $Q'_n$ will be the same, elements of $G_n$ will have non-zero phases. To meet the final target, that is $Q_n$, phase of each element in the first column of $G_n$ needs to be adjusted to cancel the accumulated phase shift within GMZI and introduce a new phase shift equal to $\arg(q_{r,1})$. This is achieved by placing n phase shifters at the output of the GMZI, resulting in a configuration referred to herein as special, or SGMZI, and is illustrated in FIG. 1. The newly introduced PSs are described by a diagonal matrix:

$$\Omega_n = \mathrm{diag}\{e^{j\omega_1}, e^{j\omega_2}, \ldots, e^{j\omega_n}\}$$

where $\omega = \arg(q_{r,1}) - \arg(g_{r,1})$, with $g_{r,1}$ denoting the r-th element in the first column vector of $G_n$. Finally, the transfer matrix of the SGMZI unit cell can be written as:

$$S_n = \Omega_n G_n$$

Figure 2:
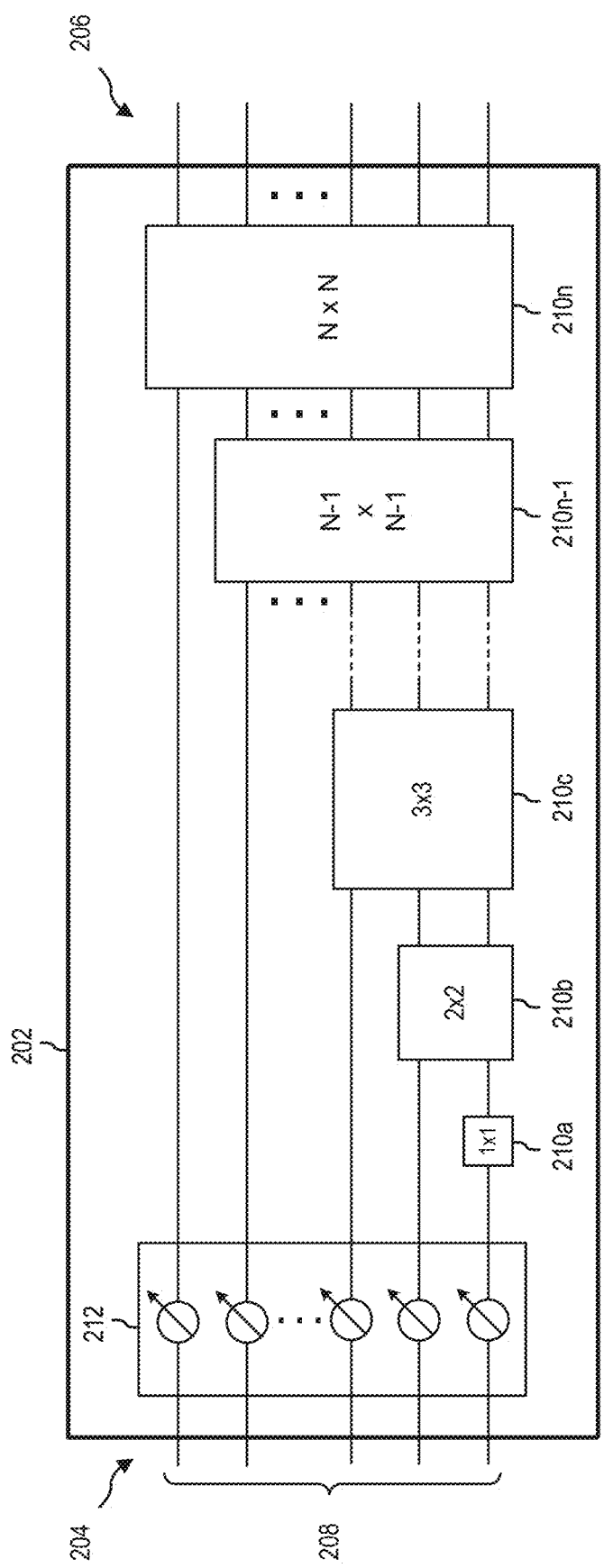
FIG. 2 illustrates an example schematic diagram of a unitary matrix circuit in accordance with one or more embodiments described herein.

Concatenating N size-augmenting SGMZIs of appropriate dimensions, from n=N to n=1, as shown, as shown in FIG. 2, a universal or U-GMZI layout may be used to represent a unitary matrix of size N, which, as will be discussed in further detail below, may also be used as a building block to represent an arbitrary matrix circuit of size N.

Referring to FIG. 2, a unitary matrix circuit 202 may include a plurality of input ports 206 and output ports 204. Each of the ports may follow a plurality of waveguide paths 208, which may include sets of waveguides that route signals between elements of the unitary matrix circuit 202. As shown in FIG. 2, the unitary matrix circuit includes a plurality of SGMZIs 210a-n. The SGMZIs 210a-n may include similar features as discussed above.

As shown in FIG. 2, the plurality of SGMZIs 210a-n may be oriented in a cascade configuration based on an order of dimensionality. For example, as shown in FIG. 2, the plurality of SGMZIs 210a-n includes a first SGMZI 210a having a first degree of dimensionality (e.g., a 1×1 dimensionality) and a second SGMZI 210b having a second degree of dimensionality (e.g., a 2×2 dimensionality). The plurality of SGMZIs 210a-n may include any number of SGMZIs up to an nth SGMZI 210n having an Nth degree of dimensionality.

Indeed, each of the SGMZIs may be ordered having iterative dimensionalities such that the waveguide paths pass through incremental numbers of SGMZIs. For example, a first waveguide path may pass through each of the plurality of SGMZIs 210a-n. A second waveguide path may pass through each of the plurality of SGMZIs 210b-n without passing through the first SGMZI 210a. Each subsequent waveguide path may pass through one less SGMZI, until a last waveguide path only passes through an nth SGMZI 210n.

As an illustrative example, where the unitary matrix circuit 202 includes a first SGMZI having a first dimension and a second SGMZI having a second dimensionality (greater than the first dimensionality), a first waveguide path may guide signals through each of the first SGMZI and the second SGMZI while a second waveguide path may guide signals through the second SGMZI without guiding signals to the first SGMZI. Where the unitary matrix circuit 202 includes a third SGMZI having a higher dimensionality than the first or second dimensionalities, the first waveguide path may guide signals through each of the first, second, and third SGMZI, the second waveguide path may guide signals through each of the second and third SGMZIs without guiding signals through the first SGMZI, and the third waveguide path may guide signals through the third SGMZI without guiding signals through either of the first SGMZI or the second SGMZI.

As used herein, first, second, third (and additional) dimensionalities may simply refer to dimensionalities of first, second, third (and additional) values. For example, a first dimensionality does not require a single dimensionality, but may simply refer to an SGZMI having an n-dimension, which may correspond to any n-value. In this example, a second dimensionality may refer to an SGZMI having n+1 dimension, with a third dimensionality referring to an SGZMI having n+2 dimension. Thus, while one or more embodiments described herein refer specifically to first, second, third, and additional SGZMIs having first, second, third, and additional dimensionalities, this may be interpreted as n, n+1, n+2, and additional dimensionalities with n referring to any of a number of arbitrary dimensionality values and taking all possible integer values between 1 and N, with N denoting the dimensions of the targeted N×N matrix.

As further shown in FIG. 2, the unitary matrix circuit 202 may include a fidelity restoration block 212. The fidelity restoration block 212 may include a plurality of attenuators for balancing outputs of the unitary matrix circuit. Each of the attenuators may correspond to a respective waveguide path. For example, a first attenuator may be located on a first waveguide path associated with a first SGMZI while a second attenuator may be located on a second waveguide path associated with a second SGMZI. Each of the attenuators may apply targeted losses to each of the respective output ports. For example, a first attenuator may apply a first targeted loss to a first output port while a second attenuator may apply a second targeted loss to a second output port, each of the targeted losses balancing respective outputs based on a number of SGMZIs that signals would pass through along the corresponding waveguide path.

While not shown in FIG. 2 (though shown in FIG. 1), the unitary matrix circuit 202 may include a plurality of phase shifters. The phase shifter may be configurable to setting matrix values for the unitary matrix circuit 202. A number of phase shifters may be equal to at least a square of a highest dimensionality of the plurality of SGMZIs.

With regard to the unitary matrix circuit, a series of acts may be performed in connection with implementing the matrix circuit for a number of practical applications. As an example, a method may include computationally factorizing a unitary matrix into a product of block-diagonal matrices comprising unitary matrix blocks and identity matrix blocks. The method may further include implementing the unitary matrix in a photonic circuit.

In the above-method, each of the unitary matrix blocks may be implemented with special generalized Mach-Zehnder interferometers (SGMZIs) configured to couple light between a set of input ports and a set of output ports, the ports in each of the sets being equal in number to a dimensionality of the SGMZIs. In addition, similar to one or more embodiments described above, the SGMZIs may include a first SGMZI having a first dimensionality and a second SGMZI optically coupled in series with the first SGMZI and having a second dimensionality greater than the first dimensionality. As further discussed above, the SGMZIs may include phase shifters. The unitary matrix circuit may control phase shifts of signals by applying the phase shifters to the SGMZIs in accordance with the factorizing of the unitary matrix into the product of block-diagonal matrices.

In one or more embodiments, a method of implementing the unitary matrix circuit may include using the photonic circuit to optically perform multiplication of the unitary matrix with an input vector by (1) coupling optical signals representing the input vector into inputs of a plurality of waveguide paths passing through the unitary matrix and (2) measuring optical signals at outputs of the plurality of waveguide paths, the measured optical signals representing an output vector corresponding to a product of the unitary matrix and the input vector.

In one or more embodiments, the method of implementing the unitary matrix circuit includes compensating for optical losses associated with the SGMZIs to restore fidelity of the photonic circuit to the unitary matrix. This may involve measuring the optical losses associated with the SGMZIs and configuring, based on the measured optical losses, a plurality of attenuators at output ports of a plurality of waveguide paths to apply targeted losses to each of the output ports to balance optical losses across the plurality of waveguide paths In one or more embodiments, some of the SGMZIs may include a pair of optical couplers. Indeed, in one or more implementations, each SGMZI having a dimensionality of two or greater (e.g., all the SGMZIs other than the first SGMZI 210*a*) may include a pair of optical couplers. Each pair of optical couplers may be associated with a given SGMZI and have a dimensionality equal to a corresponding dimensionality of the given SGMZI In reference to the configuration shown in FIG. 2, by concatenating N size augmenting SGMZIs from n=N to n=1, the unitary matrix circuit is able to represent a unitary matrix of size N. In one or more embodiments, the transfer matrix of UGMZI may be expressed as follows:

$$U_{UGMZI}(N) = \prod_{n=N}^{1} S_n^{N-n}, S_n^{N-n} = \begin{bmatrix} I_{N-n} & 0 \\ 0 & S_n \end{bmatrix}$$

having $(2N-1)+(2N-3)+ \ldots +1=N^2$ free real parameters, equal to $\dim_R U(N)$, which is agreement with a conclusion that the U-GMZI can be used for representing any unitary matrix. It is noted that an arbitrary unitary matrix, and consequently a UGMZI, can be constructed based on elementary building blocks with transfer matrices in the following form:

$$U_{UGMZI}(N) = \prod_{n=N}^{1} \tilde{S}_n^{N-n}, \tilde{S}_n^{N-n} = \begin{bmatrix} \tilde{S}_n & 0 \\ 0 & I_{N-n} \end{bmatrix}$$

where the identity block matrix is placed in the lower-right instead of the upper-left part of the elementary SGMZI matrix.

This configuration may be leveraged to form an arbitrary matrix circuit configuration. For example, the UGMZI layout shown in FIG. 2 may be used as a matrix block within an arbitrary matrix circuit with SGMZI elements concatenated again in the increasing order of dimensionality.

Figure 3A:
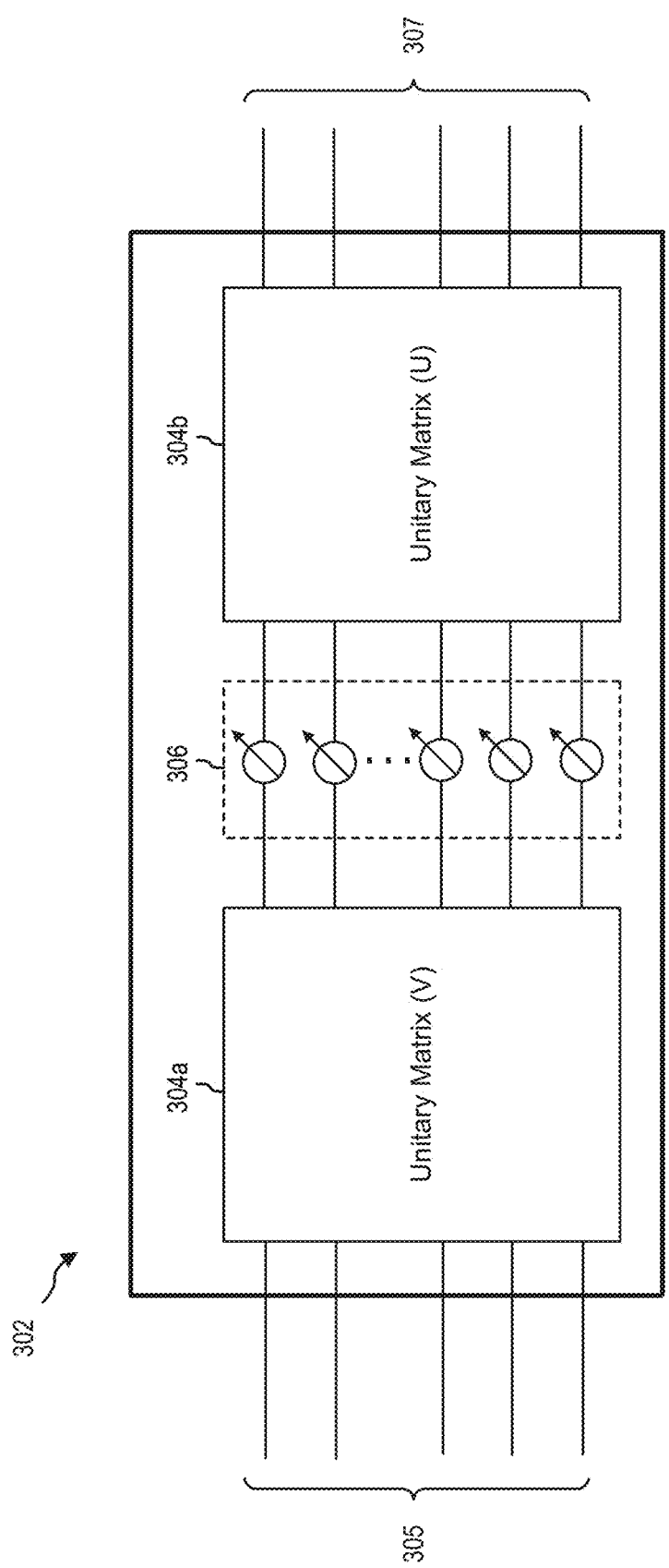
FIG. 3A illustrates an example schematic diagram of an arbitrary matrix circuit in accordance with one or more embodiments described herein.

For example, FIG. 3A illustrates an example implementation of an arbitrary matrix circuit 302. The arbitrary matrix circuit 302 includes a first matrix block 304a and a second matrix block 304b. Each of the matrix blocks 304a-b may include similar features and functionality as the unitary matrix circuit discussed above in connection with FIG. 2. As further shown in FIG. 3A, the arbitrary matrix circuit 302 may include a plurality of attenuators 306 positioned between the first matrix block 304a and the second matrix block 304b. As further shown in the illustrated example, the arbitrary matrix circuit includes a plurality of input ports 305 and a plurality of output ports 307.

Figure 3B:
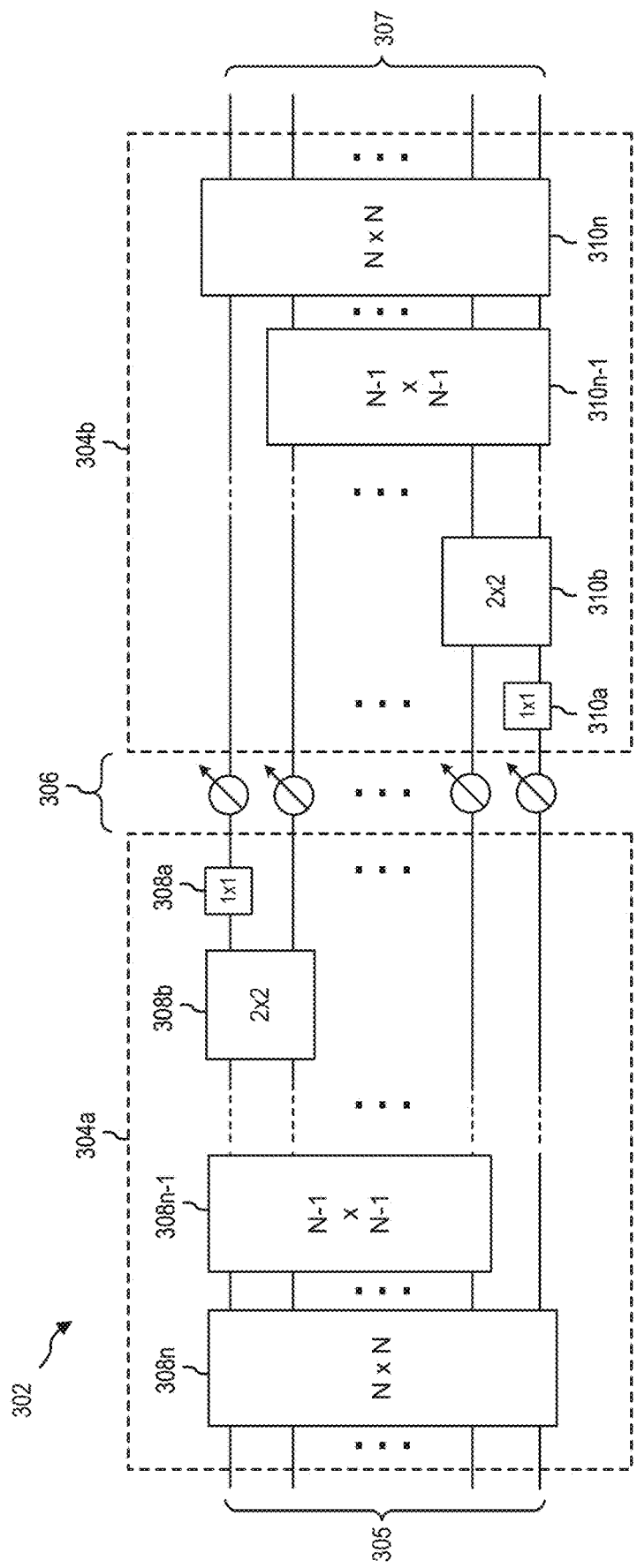
FIG. 3B illustrates a more detailed example schematic diagram of the arbitrary matrix circuit shown in FIG. 3A.

Additional information will now be given in connection with a more detailed implementation of the arbitrary matrix circuit in connection with FIG. 3B. As shown in FIG. 3B, the arbitrary matrix circuit 302 includes first and second matrix block 304a-b and the plurality of attenuators 306, as discussed above in connection with FIG. 3A. The arbitrary matrix circuit 302 additionally includes a plurality of input ports 305 and a plurality of output ports 307. As further shown, the two matrix blocks 304a-b may have mirrored SGMZI configurations relative to one another.

For instance, in the illustrated example, a first matrix block 304a includes a plurality of SGMZIs 308a-n arranged in order from a highest dimensionality to a lowest dimensionality (e.g., from left to right or, more specifically, from input ports on an opposite side of the matrix block 304a away from the attenuators 306 toward the side adjacent to the attenuators 306). In particular, a first SGMZI 308a (e.g., an SGMZI closest to the attenuators 306) may have a first dimensionality, a second SGMZI 308b adjacent to the first SGMZI 308a may have a second dimensionality, and so forth up to an Nth SGMZI 308n having an Nth dimensionality (corresponding to a highest dimensionality of the first matrix block 304a).

Similarly, a second matrix block 304b may include a second plurality of SGMZIs 310a-n arranged in order from a lowest dimensionality to a highest dimensionality (e.g., from left to right or, more specifically, from ports on the side of the second matrix block 304b adjacent the attenuators 306 to ports on an opposite side of the second matrix block 304b from the attenuators 306). In particular, a first SGMZI 310a may have a first dimensionality being the same as the first SGMZI 308a from the first matrix block 304a, a second SGMZI 310b adjacent to the first SGMZI 310a having a second dimensionality being the same as the second SGMZI 308b from the first matrix block 304a, and so forth up to an Nth SGMZI 310n having an Nth dimensionality.

As shown in FIG. 3B, each of the matrix blocks 304a-b may have a same number of SGMZIs that are oriented in reverse order relative to one another. In one or more embodiments, the SGMZIs of the respective matrix blocks 304a-b are oriented in horizonal reverse order. In one or more embodiments, the SGMZIs of the respective matrix blocks 304a-b are oriented in both horizontal and vertical reverse order relative to one another, as shown in FIG. 3B. As shown in FIG. 3B, each of the waveguide paths may pass through a corresponding attenuator from the plurality of attenuators 306 as well as an equal number of SGMZI elements.

Orienting the matrix blocks 304a-b and corresponding SGMZIs as shown in FIG. 3B provides a number of benefits associated with balancing losses of signals that pass through the arbitrary matrix circuit 302. For example, by orienting the SGMZIs to be mirror reflections of one another, signals passing through waveguide paths of the arbitrary matrix circuit will pass through a same number of components (e.g., SGMZIs and attenuators) resulting in uniform losses across each of the output ports. Thus, each of the signals passing between the plurality of input ports 305 and the plurality of output ports 307 will pass through the same number of SGMZIs and attenuators and achieve a natural balancing of losses between each of the outputs from the arbitrary matrix circuit 302.

Indeed, as shown in FIG. 3B, each waveguide path may pass through an equal number of SGMZI elements between the first plurality of SGMZIs 308a-n and the second plurality of SGMZIs 310a-n. In this way, the losses may be balanced between the plurality of waveguide paths based on signals pasting through the equal number of SGMZI elements (and attenuator(s). As shown in the illustrated configuration, each waveguide path passes through a first number of SGMZIs equal to one greater than the highest dimensionality of the plurality of SGMZIs. (e.g., N+1 SGMZIs). Indeed, each waveguide path passes through the first number of SGMZIs without passing through a second number of SGMZIs equal to one less than the highest dimensionality of the plurality of SGMZIs (e.g., N−1 SGMZIs).

With regard to the arbitrary matrix circuit, a series of acts may be performed in connection with implementing the matrix circuit for a number of practical applications. As an example, a method may include computationally factorizing an arbitrary matrix by singular value decomposition into a product of a first unitary matrix, a diagonal matrix, and a second unitary matrix. The method may further include implementing the arbitrary matrix in a photonic circuit.

In one or more embodiments, the first unitary matrix is implemented within a first matrix block including a first plurality of special generalized Mach-Zehnder Interferometers (SGMZIs) coupled in series in order of dimensionality from a lowest dimensionality of the plurality of SGMZIs to a highest dimensionality of the plurality of SGMZIs. Similarly, the second unitary matrix may be implemented within a second matrix block including a second plurality of SGMZIs coupled in series in reverse order of dimensionality relative to the order of dimensionality that the first plurality of SGMZIs are ordered within the first matrix block. In one or more embodiments, the first unitary matrix and the second unitary matrix are optically coupled via a plurality of waveguide paths passing through the first matrix block and the second matrix block.

In one or more embodiments, the method of implementing the arbitrary matrix circuit further includes computationally factorizing each of the first unitary matrix and the second unitary matric into a product of block-diagonal matrices each including a unitary matrix block and an identity matrix block of complementary dimensionality. In one or more embodiments, the diagonal matrix is implemented as a plurality of attenuators positioned between the first matrix block and the second matrix block, each attenuator of the plurality of attenuators corresponding to a waveguide path from the plurality of waveguide paths.

In one or more embodiments, each waveguide path of the plurality of waveguide paths passes through an equal number of SGMZIs from the first plurality of SGMZIs and the second plurality of SGMZIs. In this manner, the losses may be balanced between the plurality of waveguide paths based on signals passing through the plurality of waveguide paths passing through the equal number of SGMZIs.

In one or more embodiments, the first plurality of SGMZIs has a first cascaded orientation associated with the order of dimensionality in which the first plurality of SGMZIs are positioned within the first matrix block. In addition, the second plurality of SGMZIs may have a second cascaded orientation associated with the order of dimensionality in which the second plurality of SGMZIs are positioned within the second matrix block. In one or more embodiments, the first cascaded orientation is horizontally mirrored to the second cascaded orientation. In one or more embodiments, the orientations are horizontally and vertically mirrored to one another.

Additional detail will now be discussed in connection with the UGMZI decomposition scheme both in connection with the unitary matrix circuit and the arbitrary matrix circuit.

For example, implementation of an arbitrary unitary matrix with realistic, non-ideal components may result in a discrepancy between the achieved and targeted matrix element values. To quantity this discrepancy, a fidelity parameter may be relied on, which is typically used in tolerance analysis of a photonic architecture versus an idealized counterpart. The UGMZI based unitary matrix decomposition approach may be benchmarked against state-of-the-art architectures (e.g., Reck's architecture and Clement's architectures, as mentioned above). The standard fidelity measure, based on a Frobenius inner product of two matrices and normalized to balanced losses (e.g., the equal losses enforced alone all paths) may be shown as:

$$F(U, U_{exp}) = \left| \frac{tr(U^\dagger U_{exp})}{\sqrt{tr(U^\dagger U) tr(U_{exp}^\dagger U_{exp})}} \right|^2$$

where U is the targeted unitary matrix of size N and $U_{exp}$ an experimental counterpart, with $U^\dagger$ and $U_{exp}^\dagger$ denoting conjugate transposes, respectively. Knowing that the targeted matrix U is indeed unitary, we have $tr(U^\dagger U)=N$, which does not generally hold true for experimental implementation, $U_{exp}$, due to deviations originating from lossy optical elements and phase errors in the PS structures.

Accounting for loss in optical elements and relying on the equation above for $U_{GMZI}(N)$, the experimental implementation of the targeted unitary matrix may be expressed as follows:

$$U_{exp,UGMZI} = \prod_{n=N}^{1} S_{exp,n}^{N-n}$$

where the transmittivity factor of the lossy nodes, $k_n \leq 1$, associated with the n-th node losses as $IL_{n,node,dB} = -10 \log_{10}(k_n^2)$, modifies the ideal matrices $S_n^{N-n}$ to the following:

$$S_{exp,n}^{N-n} = k_n \begin{bmatrix} k_n^{-1} I_{N-n} & 0 \\ 0 & S_n \end{bmatrix}$$

After an iterative process of N mid-to-edge matrix multiplications, the following equations are derived:

$$U_{UGMZI}^\dagger U_{exp,UGMZI} = \prod_{n=1}^{N} k_n \cdot B_U^{-1}$$

$$U_{exp,UGMZI}^\dagger U_{exp,UGMZI} = \prod_{n=1}^{N} k_n^2 \cdot (B_U^{-1})^2$$

where $B_U^{-1}$ is a diagonal matrix that embraces the unbalanced loss factors of the system and reads:

$$B_U^{-1} = \text{diag}\left[ \prod_{n=1}^{N-1} k_n^{-1}, \prod_{n=1}^{N-2} k_n^{-1}, \ldots, k_1^{-1}, 1 \right]$$

By substituting the $U_{UGMZI}^\dagger U_{exp,UGMZI}$ expression to the above $F(U, U_{exp})$ expression, $F_{UGMZI}$ may be expressed as follows:

$$F_{UGMZI} = \left| \frac{\sum_{l=1}^{N} \prod_{n=l}^{N} k_n}{\sqrt{N \sum_{l=1}^{N} \prod_{n=l}^{N} k_n^2}} \right|^2$$

The above series of equations indicates that $U_{UGMZI}^\dagger U_{exp,UGMZI}$ and $U_{exp,UGMZI}^\dagger U_{exp,UGMZI}$ depend solely on the loss-associated factors $k_n$ and the dimension of the problem N. This implies that by compensating components to the inputs of the baseline UGMZI architecture in the form of either Variable Optical Attenuators (VOA), as shown in FIG. 2, or amplifiers, the matrix circuits described herein may fully balance losses and achieve balance. The addition of the balancing components algebraically translates to the multiplication of $U_{exp,UGMZI}$ with a diagonal matrix $B_U$ (e.g., the inverse of $B_U^{-1}$) from the right in case of attenuators, or by $\prod_{n=1}^{N} k_n^{-1}$. $B_U$ in the case of amplifiers. For simplicity, and to mitigate employing the active components, in what follows VOAs may be chosen for balancing components, yielding:

$$U_{exp,BUGMZI} = \prod_{n=N}^{1} S_{exp,n}^{N-n} \cdot B_U$$

Exploiting the balanced experimental matrix and relying on the fact that $B_U^\dagger = B_U$ since the matrix $B_U$ is diagonal and populated by real elements, the following previously outlined fidelity calculation procedure can acquire:

$$U_{UGMZI}^\dagger U_{exp,BUGMZI} = \prod_{n=1}^{N} k_n \cdot I_N$$

$$U_{exp,BUGMZI}^\dagger U_{exp,BUGMZI} = \prod_{n=1}^{N} k_n^2 \cdot I_N$$

which, according to the equation for $F(U, U_{exp})$ above, yields absolute fidelity, $F_{BUGMZI} = 1$.

As indicated above, tests conducted on the disclosed architectures of the unitary and arbitrary matrix circuits yield improved results over conventional state of the art architectures. For example, in fidelity performance averaged over five-hundred matrix samples per combination of N and $IL_{node,dB}$, with respect to the circuit size and the losses per node, an unbalanced UGMZI scheme may yield a degraded fidelity behavior in comparison to both the Clement's and Reck's schemes, yielding up to 70% and 30% accuracy in a 20×20 implementation for $IL_{node,dB}=0.5$ dB and $IL_{node,dB}=1.5$ dB, respectively, while the corresponding Clements layout yields 99.5% and 95% accuracy. Moreover, in the case of $IL_{node,dB}=2$ dB and N=20, the unbalanced UGMZI degrades even more, to approximately 22%, while Clement's implementation remains >90%.

Nevertheless, balancing the losses in UGMZI architecture allows for full fidelity restoration, as discussed above, and as shown in experimental results showing performance of the arbitrary matrix circuit relative to conventional counterparts. For example, the fidelity gap for N=20 unitary matrix implementation with 2 dB loss per node may reach ~8% between BUGMZI and Clements' and >80% in comparison to Reck's implementation.

The fidelity restoration properties of the UGMZI layout together with its size-augmenting design can bring important fidelity-related benefits also for universal linear optics where not only unitary but any real or complex-matrix representation is targeted and is typically realized by a SVD decomposition procedure. The SVD assumes factorization of any matrix D in the form of $D=U\Sigma V^\dagger$, where U and $V^\dagger$ are unitary matrices and $\Sigma=\text{diag}[\sigma_1, \sigma_2, \ldots, \sigma_n]$ is a diagonal matrix with non-negative real elements represented by VOAs in a photonic platform. In order to validate the performance of an SVD-based matrix implementation using the UGMZI design for realizing U and $V^\dagger$ unitary matrices, we compare loss tolerance with respect to an SVD-based deployment where the Clements approach (proven to be the optimal so far) is utilized for the U and $V^\dagger$ matrix layouts.

Moreover, as loss imbalance has been observed in UGMZI architecture, instead of concatenating two baseline UGMZIs, separated by a column of VOAs, a UGMZI flipped around a horizontal axis may be used, similar to the described arbitrary matrix circuit discussed above in connection with FIG. 3B. This horizontally flipped configuration may result in the following expressions:

$$U = \prod_{n=N}^{1} S_{U,n}^{N-n}, \tilde{S}_{U,n}^{N-n} = \begin{bmatrix} I_{N-n} & 0 \\ 0 & S_{U,n} \end{bmatrix}$$

$$V = \prod_{n=N}^{1} \tilde{S}_{V,n}^{N-n}, \tilde{S}_{V,n}^{N-n} = \begin{bmatrix} \tilde{S}_{V,n} & 0 \\ 0 & I_{N-n} \end{bmatrix}$$

As the photonic platform should represent $V^\dagger$ rather than V, the UGMZI that has been flipped along the horizontal axis for representing the matrix V has also to be flipped along its vertical axis in order to produce the $V^\dagger$, complying with $$V^\dagger = \prod_{n=1}^{N} (\tilde{S}_{V,n}^{N-n})^\dagger,$$

where the constituent VMZIs acting on an optical input vector will be concatenated from n=N to n=1 following the direction of light propagation. The experimental realization of the matrices is again expected to deviate from targeted matrices U, Σ, and $V^\dagger$. In a similar manner to $U_{exp,UGMZI}$ and $S_{exp,n}^{N-n}$ discussed above, the experimental metric may be defined as follows:

$$U_{exp} = \prod_{n=N}^{1} S_{U,exp,n}^{N-n}, S_{U,exp,n}^{N-n} = k_n \begin{bmatrix} k_n^{-1} I_{N-n} & 0 \\ 0 & S_{U,n} \end{bmatrix}$$

$$V_{exp} = \prod_{n=N}^{1} \tilde{S}_{V,exp,n}^{N-n}, \tilde{S}_{V,exp,n}^{N-n} = k_n \begin{bmatrix} k_n^{-1} \tilde{S}_{V,n} & 0 \\ 0 & I_{N-n} \end{bmatrix}$$

$$\Sigma_{exp} = k_\sigma \Sigma$$

assuming that the SGMZI blocks of the identical size in both U and $V^\dagger$ introduce the same losses ($k_{U,n}=k_{V,n}=k_n$), which generally differs for the SGMZIs of different sizes ($k_n \neq k_m$ if $n \neq m$).

It will be noted that the proposed unitary and arbitrary matrix circuit architectures provide additional benefits and improvements over state of the art architectures and features of conventional photonic circuits. As noted above, additional detail in connection with performance of the unitary and arbitrary matrix configurations is described in U.S. Provisional Application No. 63/261,974 entitled FIDELITY-RESTORABLE PHOTONIC LINEAR OPERATOR, the entirety of which is incorporated herein by reference.

The disclosed photonic circuits may be implemented as photonic integrated circuits (PICs) (although bulk-optic implementations are, in principle, also possible), e.g., on a silicon-on-insulator (SOI) substrate, and can be manufactured using existing semiconductor foundries, which enables high-volume manufacturing at low cost. In a PIC implementation, passive optical structures, such as the input and output waveguides and optical couplers of the unitary matrix circuits, may be formed in a (e.g., silicon) device layer of the substrate, e.g., by photolithographic patterning and etching. An n×n optical coupler may, for instance, be implemented as a multimode interferometer, or with cascaded stages of lower-dimensional couplers. The phase shifters in the SGMZIs may include electro-optic and/or thermal phase shifters that modulate the refractive index within the interferometer paths between the couplers by application of an electrical voltage or heat, respectively. In the case of a thermal phase shifter, heat is usually applied by one or more Ohmic heating filaments; thus, thermal phase shifters, like electro-optic phase shifters, can be controlled via electronic signals. Amplitude modulators, e.g., as used for fidelity restoration, or to implement the diagonal matrix in an SVD of an arbitrary matrix, may likewise be implemented by electro-optic or thermo-optic components, such as, e.g., electro-absorption modulators (EAMs), optical resonant modulators, or MZIs with a phase shifter in one of the interferometer branches, or by variable optical attenuators (VOAs).

Figure 4:
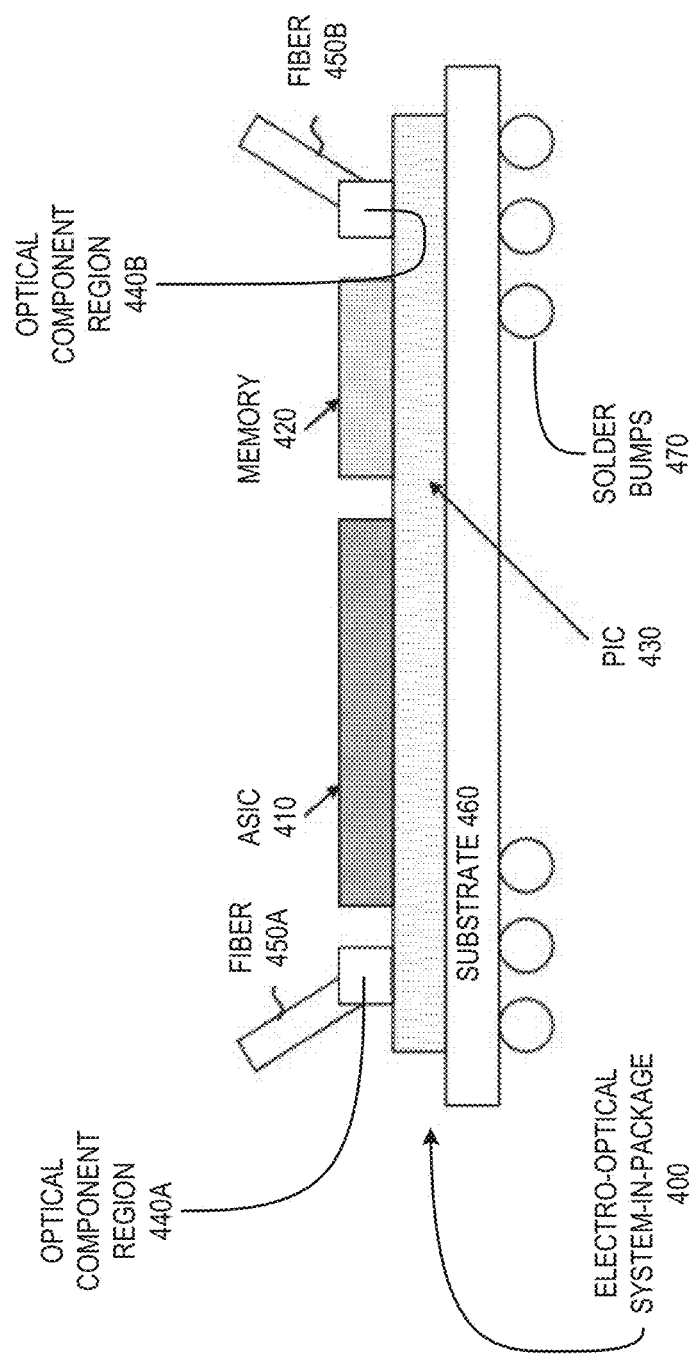
FIG. 4 illustrates an example structural implementation of an electro-optical system-in-package.

As an illustrative example, FIG. 4 shows a view of an example structural implementation of an electro-optical system-in-package 400 (or simply "SIP 400") according to some embodiments. In this example, an electric integrated circuit (EIC), such as an application-specific integrated circuit (ASIC) 410 (or simply "ASIC 410") and a photonic integrated circuit (PIC) 430 (or simply "PIC 430") are formed in separate semiconductor chips (e.g., silicon chips made using a lithography apparatus, although the user of other semiconductor materials is conceivable). As shown in FIG. 4, the PIC 430 is disposed directly on a substrate 460, shown with solder bumps 470 for subsequent mounting to a printed circuit board (PCB) (not shown). The EIC 410, the memory 420, and optical component regions 440A and 440B that connect the PIC 430 to optical fibers 450A and 450B are disposed on top of and optically connected to the PIC 430.

As will be appreciated by those of skill in the art, the depicted structure of the SIP 400 is one of several possible ways to assemble and package the various components. In alternative embodiments, the EIC 410 may, for example, be disposed on the substrate, with the PIC 430 being placed on top of the EIC 410. In principle, as an alternative to implementing the electronic and photonic circuit layers as separate chips, it is also possible to create the EIC 410 and PIC 430 in different layers of a single semiconductor chip. Further, the photonic layer may have multiple PICs in multiple sub-layers (e.g., to reduce waveguide crossings). Moreover, the structure depicted in FIG. 4 may be modified to include multiple EICs connected to a single PIC, and via photonic channels in the PIC 430 to each other. The EIC 410 and the PIC 430 can be manufactured using standard wafer fabrication processes, including, e.g., photolithographic patterning, etching, ion implantation, etc. Furthermore, In some embodiments, heterogeneous material platforms and integration processes are used. For example, various active photonic components, such as the laser light sources and/or optical modulators and photodetectors used in the photonic channels, may be implemented using group III-V semiconductor components.

The laser light source(s) can be implemented either in the SIP 400 or externally. When implemented externally, a connection to the SIP 400 can be made optically, (e.g., using a grating coupler in the PIC 430 underneath the optical component regions 440A and 440B) using a fiber attach unit or an edge coupler, for example, supplied by fibers 450A or 450B. To implement lasers in the SIP 400, one option is to use an interposer containing several lasers that can be co-packaged and edge-coupled with the PIC 430. Alternatively, the lasers can be integrated directly into the PIC 430 using heterogenous or homogenous integration. Homogenous integration allows lasers to be directly implemented in the silicon substrate 460 in which the waveguides of the PIC 430 are formed, and allows for lasers of different materials, (such as Indium Phosphide), and architectures (such as quantum dot lasers). Heterogenous assembly of lasers on the PIC 430 allows for group III-V semiconductors or other materials to be precision-attached onto the PIC 430 and optically coupled to a waveguide implemented on the PIC 430.

Several SIPs 400, each including its own electro-optical network may be interconnected to result in a single system providing a larger electro-optical network. For example, multiple SIPs configured as ML processors may be interconnected to form a larger ML accelerator. The photonic channels within the several SIPs or ML processors, along with optical connections, laser light sources, passive optical components, and external optical fibers on the PCB, which may be utilized in various combinations and configurations along with other photonic elements, form a photonic fabric of the multi-SIP system or multi-ML-processor accelerator.

As an alternative to electronically controlled implementations, the phase shifters and/or amplitude modulators of the matrix circuits may also be optically controlled (e.g., using the photorefractive effect), or provided by non-volatile optical memory implemented by optical phase-change materials (O-PCMs). O-PCMs, such as various chalcogenide alloys (e.g., germanium-antimony-tellurium (GST) alloys), can undergo gradual changes between their crystalline and amorphous phases, and can be set, e.g., by controlled application of heat, to any physical phase along a continuum of phases between crystalline and amorphous. The different physical phases have different associated electrical and/or optical properties. Thus, O-PCMs, e.g., when disposed as thin films on top of a waveguide, can affect a change in the optical properties, such as refractive index and absorption, of the waveguide itself (e.g., by virtue of the overlap of the evanescent field of any guided mode with the PCM film).

In addition to the circuitry implementing the unitary or arbitrary matrix itself, the PIC may also include amplitude modulators and/or phase shifters for modulating an optical carrier signal to generate optical input signals representing an input vector, and photodetectors to measure the optical output signals representing the output vector. A laser for generating the carrier light may likewise be integrated on the PIC. Alternatively, externally generated laser light may be coupled into waveguides of the PIC, e.g., via edge couplers or grating couplers. Integrated active optical components, such as lasers and photodetectors, may be implemented as p-i-n diode structures, e.g., using III-V or other compound semiconductor materials.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A unitary matrix circuit, comprising:
a plurality of special generalized Mach-Zehnder interferometers (SGMZIs), wherein each SGMZI in the plurality of SGMZIs includes a GMZI of n dimensions that is augmented with a distinct set of at least n−1 external phase shifters at inputs or outputs of the GMZI, the plurality of SGMZIs including:
a first SGMZI having a first dimensionality; and
a second SGMZI coupled in series to the first SGMZI, the second SGMZI having a second dimensionality greater than the first dimensionality;
a plurality of waveguide paths, the plurality of waveguide paths comprising:
a first waveguide path that guides signals through the first SGMZI and the second SGMZI; and
a second waveguide path that guides signals through the second SGMZI; and
a fidelity restoration block coupled to the plurality of SGMZIs, the fidelity restoration block including attenuators for balancing outputs of the unitary matrix circuit.

2. The unitary matrix circuit of claim 1, wherein the second waveguide path guides signals through the second SGMZI without guiding signals through the first SGMZI.

3. The unitary matrix circuit of claim 1, wherein the plurality of SGMZIs includes a third SGMZI having a third dimensionality greater than the first dimensionality and the second dimensionality.

4. The unitary matrix circuit of claim 3, wherein the plurality of waveguide paths includes a third waveguide path that guides signals through the third SGMZI.

5. The unitary matrix circuit of claim 4, wherein:
the first waveguide path guides signals through each of the first SGMZI, the second SGMZI, and the third SGMZI;
wherein the second waveguide path guides signals through each of the second SGMZI and the third SGMZI without guiding signals through the first SGMZI; and
the third waveguide path guides signals through the third SGMZI without guiding signals through the first SGMZI and without guiding signals through the second SGMZI.

6. The unitary matrix circuit of claim 5, wherein the fidelity restoration block includes a first attenuator coupled to the first SGMZI that balances an output of the first waveguide path and a second attenuator coupled to the second SGMZI that balances an output of the second waveguide path.

7. The unitary matrix circuit of claim 6, wherein the first attenuator and the second attenuator balance the outputs of a first output port and a second output port by applying targeted losses to signals at each of the first output port and the second output port.

8. The unitary matrix circuit of claim 1, further comprising a plurality of phase shifters configurable to setting matrix values for a unitary matrix.

9. The unitary matrix circuit of claim 8, wherein a number of the plurality of phase shifters is equal to at least a square of a highest dimensionality of the plurality of SGMZIs.

10. The unitary matrix circuit of claim 1, wherein each SGMZI from the plurality of SGMZIs having a dimensionality of two or greater includes a pair of optical couplers, the pair of optical couplers associated with a given SGMZI having a dimensionality equal to a corresponding dimensionality of the given SGMZI.

11. A photonic circuit comprising at least one unitary matrix circuit, the at least one unitary matrix circuit including:
a plurality of special generalized Mach-Zehnder interferometers (SGMZIs), wherein each SGMZI in the plurality of SGMZIs includes a GMZI of n dimensions that is augmented with a distinct set of at least n−1 external phase shifters at inputs or outputs of the GMZI, the plurality of SGMZIs including:
a first SGMZI having a first dimensionality; and
a second SGMZI coupled in series to the first SGMZI, the second SGMZI having a second dimensionality greater than the first dimensionality; and
a plurality of waveguide paths, the plurality of waveguide paths comprising:
a first waveguide path that guides signals through the first SGMZI and the second SGMZI; and
a second waveguide path that guides signals through the second SGMZI.

12. The photonic circuit of claim 11, wherein the at least one unitary matrix circuit further includes a fidelity restoration block including a first attenuator coupled to the plurality of SGMZIs on the first waveguide path associated with the first SGMZI and a second attenuator coupled to the plurality of SGMZIs on the second waveguide path associated with the second SGMZI, wherein the first attenuator and the second attenuator balance the outputs of a first output port and a second output port by applying targeted losses to signals at each of the first output port and the second output port.

13. The photonic circuit of claim 11, wherein the second waveguide path guides signals through the second SGMZI without guiding signals through the first SGMZI.

14. The photonic circuit of claim 11, wherein:
the plurality of SGMZIs includes a third SGMZI having a third dimensionality greater than the first dimensionality and the second dimensionality; and
the plurality of waveguide paths includes a third waveguide path that guides signals through the third SGMZI.

15. The photonic circuit of claim 14, wherein;
the first waveguide path guides signals through each of the first SGMZI, the second SGMZI, and the third SGMZI;
the second waveguide path guides signals through each of the second SGMZI and the third SGMZI without guiding signals through the first SGMZI; and
the third waveguide path guides signals through the third SGMZI without guiding signals through the first SGMZI and without guiding signals through the second SGMZI.

16. The photonic circuit of claim 11, wherein the at least one unitary matrix circuit includes a plurality of phase shifters configurable to setting matrix values for a unitary matrix, and wherein a number of the plurality of phase shifters is equal to at least a square of a highest dimensionality of the plurality of SGMZIs.

\* \* \* \* \*